US012634249B2

(12) United States Patent
Huang et al.

(10) Patent No.: US 12,634,249 B2
(45) Date of Patent: May 19, 2026

(54) GROUP CHAT-BASED INSTANT MESSAGING METHOD AND APPARATUS, DEVICE, COMPUTER-READABLE STORAGE MEDIUM, AND COMPUTER PROGRAM PRODUCT

(71) Applicant: Tencent Technology (Shenzhen) Company Limited, Guangdong (CN)

(72) Inventors: Tieming Huang, Shenzhen (CN); Bin Li, Shenzhen (CN); Li Lin, Shenzhen (CN); Yijun Luo, Shenzhen (CN); Tanglei Pan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/521,475

(22) Filed: Nov. 28, 2023

(65) Prior Publication Data
US 2024/0098047 A1 Mar. 21, 2024

Related U.S. Application Data

(63) Continuation of application No. PCT/CN2023/079035, filed on Mar. 1, 2023.

(30) Foreign Application Priority Data

Mar. 17, 2022 (CN) ........................ 202210267447.X

(51) Int. Cl.
*H04L 67/565* (2022.01)
*H04L 51/02* (2022.01)
(Continued)

(52) U.S. Cl.
CPC .......... *H04L 51/046* (2013.01); *H04L 51/063* (2013.01); *H04L 51/066* (2013.01); *H04L 51/212* (2022.05)

(58) Field of Classification Search
CPC ......... H04W 4/08; H04W 4/12; H04W 4/806; H04W 4/90; H04L 51/224; H04L 63/062;
(Continued)

(56) References Cited

U.S. PATENT DOCUMENTS 8,407,357 B2 3/2013 Oh et al.
2009/0006565 A1* 1/2009 Velusamy ............ G06Q 10/107
715/733
(Continued)

OTHER PUBLICATIONS

Extended European Search Report received for European Patent Application No. 23769563.0, mailed on Mar. 20, 2025, 9 pages.

*Primary Examiner* — Christopher B Robinson
*Assistant Examiner* — Ho T Shiu
(74) *Attorney, Agent, or Firm* — ARENTFOX SCHIFF LLP

(57) ABSTRACT

In a group chat-based instant messaging method, a message is received from a first messaging application of a first user in a first messaging group. The first messaging application is associated with a first messaging service. When the message is to be announced to all group members of the first messaging group, whether the first user is authorized to send the message is determined based on identity information of the first user. Based on the first user being authorized, protocol conversion on the message is performed based on a second messaging protocol of a second messaging service to output the message in a first preset announcement style for messages announced to all group members. The converted message is transmitted, via a second messaging server, to a second messaging application corresponding to one of the plurality of group members in the first messaging group.

20 Claims, 9 Drawing Sheets

(51) Int. Cl.

| | |
|---|---|
| *H04L 51/04* | (2022.01) |
| *H04L 51/046* | (2022.01) |
| *H04L 51/063* | (2022.01) |
| *H04L 51/066* | (2022.01) |
| *H04L 51/212* | (2022.01) |
| *H04L 51/216* | (2022.01) |
| *H04L 51/56* | (2022.01) |

(58) Field of Classification Search
CPC ... H04L 63/065; H04L 63/107; H04L 65/611;
H04L 67/10; H04L 674/1051; H04L
37/1059; H04L 51/216; H04L 63/104;
H04L 51/02; H04Q 4/08
See application file for complete search history.

(56) References Cited

U.S. PATENT DOCUMENTS

| | | | |
|---|---|---|---|
| 2019/0373437 A1* | 12/2019 | Goodenough Welch | .................... H04L 51/52 |
| 2021/0044551 A1* | 2/2021 | Cohen | .................... H04L 51/216 |
| 2021/0134159 A1* | 5/2021 | Cao | ......................... H04W 4/40 |
| 2021/0243142 A1* | 8/2021 | Treat | ...................... H04L 51/04 |
| 2023/0124204 A1* | 4/2023 | Jiang | ..................... G06F 3/0481 715/753 |
| 2024/0348565 A1* | 10/2024 | Shi | .......................... H04L 51/04 |

* cited by examiner

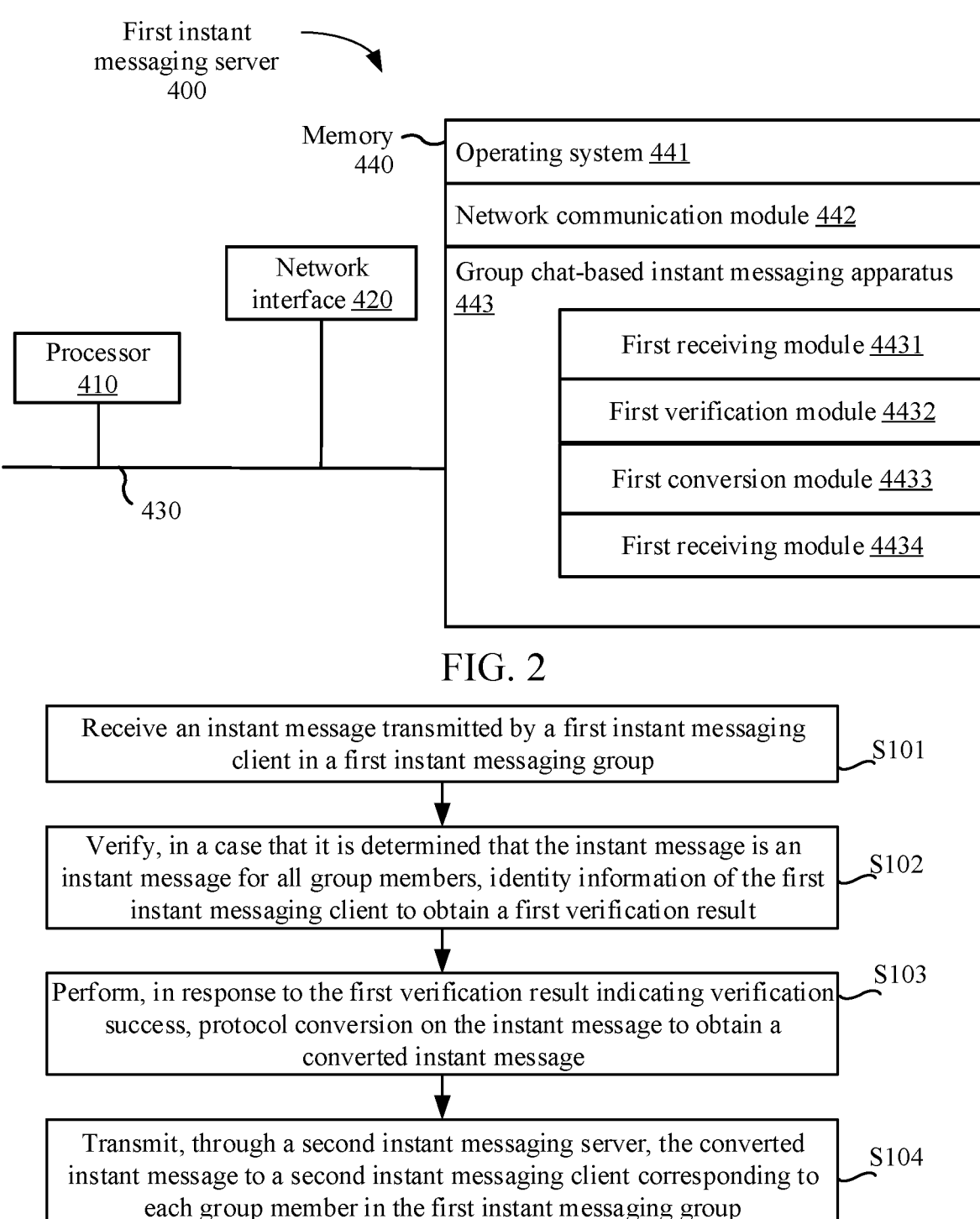

FIG. 2

Receive an instant message transmitted by a first instant messaging
client in a first instant messaging group
S101

Verify, in a case that it is determined that the instant message is an
instant message for all group members, identity information of the first
instant messaging client to obtain a first verification result
S102

Perform, in response to the first verification result indicating verification
success, protocol conversion on the instant message to obtain a
converted instant message
S103

Transmit, through a second instant messaging server, the converted
instant message to a second instant messaging client corresponding to
each group member in the first instant messaging group
S104

FIG. 3

GROUP CHAT-BASED INSTANT MESSAGING METHOD AND APPARATUS, DEVICE, COMPUTER-READABLE STORAGE MEDIUM, AND COMPUTER PROGRAM PRODUCT

RELATED APPLICATIONS

This application is a continuation of International Application No. PCT/CN2023/079035 filed on Mar. 1, 2023, which claims priority to Chinese Patent Application No. 202210267447.X, filed on Mar. 17, 2022. The entire disclosures of the prior applications are hereby incorporated by reference.

FIELD OF THE TECHNOLOGY

This disclosure relates to the field of Internet technologies, including to a group chat-based instant messaging method and apparatus, a device, a computer-readable storage medium, and a computer program product.

BACKGROUND OF THE DISCLOSURE

An enterprise instant messaging application can exchange messages with a personal instant messaging application corresponding to the enterprise instant messaging application. Employees of an enterprise can directly talk to their friends in a personal instant messaging application in a single chat or group chat manner. However, to two heterogeneous large-scale instant messaging (IM) systems may have many unique service attributes and may not be fully aligned. For an instant message for everyone and a group announcement special reminder, the enterprise instant messaging application and the personal instant messaging application may have different internal operating permissions, interaction protocols, and display forms, resulting in that an instant message for everyone or a group announcement transmitted by a user of the enterprise instant messaging application cannot be displayed in an aligned manner in the personal instant messaging application.

SUMMARY

Embodiments of this disclosure provide a group chat-based instant messaging method and apparatus, a non-transitory computer-readable storage medium, and a computer program product, which can realize aligned display of an instant message in heterogeneous instant messaging applications.

Technical solutions in the embodiments of this disclosure may be implemented as follows.

An embodiment of this disclosure provides a group chat-based instant messaging method. In the group chat-based instant messaging method, a message is received from a first messaging application of a first user in a first messaging group. The first messaging application is associated with a first messaging service. When the message is to be announced to all group members of the first messaging group, whether the first user is authorized to send the message is determined based on identity information of the first user. Based on the first user being authorized to send the message to be announced to all group members, protocol conversion on the message is performed based on a second messaging protocol of a second messaging service to output the message in a first preset announcement style for messages announced to all group members. The second messaging protocol of the second messaging service is different from a first messaging protocol of the first messaging service. The converted message is transmitted, via a second messaging server, to a second messaging application corresponding to one of the plurality of group members in the first messaging group.

An embodiment of this disclosure provides a group chat-based instant messaging apparatus, which includes processing circuitry. The processing circuitry is configured to receive a message from a first messaging application of a first user in a first messaging group, the first messaging application being associated with a first messaging service. The processing circuitry is configured to determine, when the message is to be announced to all group members of the first messaging group, whether the first user is authorized to send the message based on identity information of the first user. The processing circuitry is configured to perform, based on the first user being authorized to send the message to be announced to all group members, protocol conversion on the message based on a second messaging protocol of a second messaging service to output the message in a first preset announcement style for messages announced to all group members, the second messaging protocol of the second messaging service being different from a first messaging protocol of the first messaging service. The processing circuitry is configured to transmit, via a second messaging server, the converted message to a second messaging application corresponding to one of the plurality of group members in the first messaging group.

An embodiment of this disclosure provides a computer device, which includes a memory, configured to store executable instructions; and a processor, configured to implement the group chat-based instant messaging method according to the embodiments of this disclosure by executing the executable instructions stored in the memory.

An embodiment of this disclosure provides a non-transitory computer-readable storage medium storing instructions which when executed by a processor cause the processor to implement the group chat-based instant messaging method according to the embodiments of this disclosure.

An embodiment of this disclosure provides a computer program product, which includes a computer program or instructions. The computer program or instructions are stored in a computer-readable storage medium.

A processor of a computer device reads the computer program or instructions from the computer-readable storage medium and executes the computer program or instructions to implement the group chat-based instant messaging method according to the embodiments of this disclosure.

The embodiments of this disclosure may have the following beneficial effects:

After a first instant messaging server (an enterprise instant messaging server) receives an instant message transmitted by a first instant messaging client (an enterprise instant messaging client) in a first instant messaging group, in a case that it is determined that the instant message is an instant message for all group members, identity information of the first instant messaging client needs to be verified to obtain a first verification result. In response to the first verification result indicating verification success, protocol conversion is performed on the instant message to obtain a converted instant message. The converted instant message is transmitted, through a second instant messaging server, to a second instant messaging client (a personal instant messaging client) corresponding to each group member in the first instant messaging group. After receiving the converted instant message, the second instant messaging client may output the instant message in a first preset style corresponding to an instant message for all group members, and correspondingly, may further output a notification message indicating that a new message is received.

In this way, display of the instant message for all group members that is transmitted through the enterprise client and reminding on the message will be performed at the personal instant messaging client in the same way as the enterprise client. That is, unification of message display and reminding on messages can be realized in two heterogeneous instant messaging systems. Accordingly, the messaging efficiency can be improved.

BRIEF DESCRIPTION OF THE DRAWINGS

FIG. 2 is a schematic structural diagram of a server according to an embodiment of this disclosure.

FIG. 3 is a schematic flowchart of an implementation of a group chat-based instant messaging method according to an embodiment of this disclosure.

DESCRIPTION OF EMBODIMENTS

Figure 1:
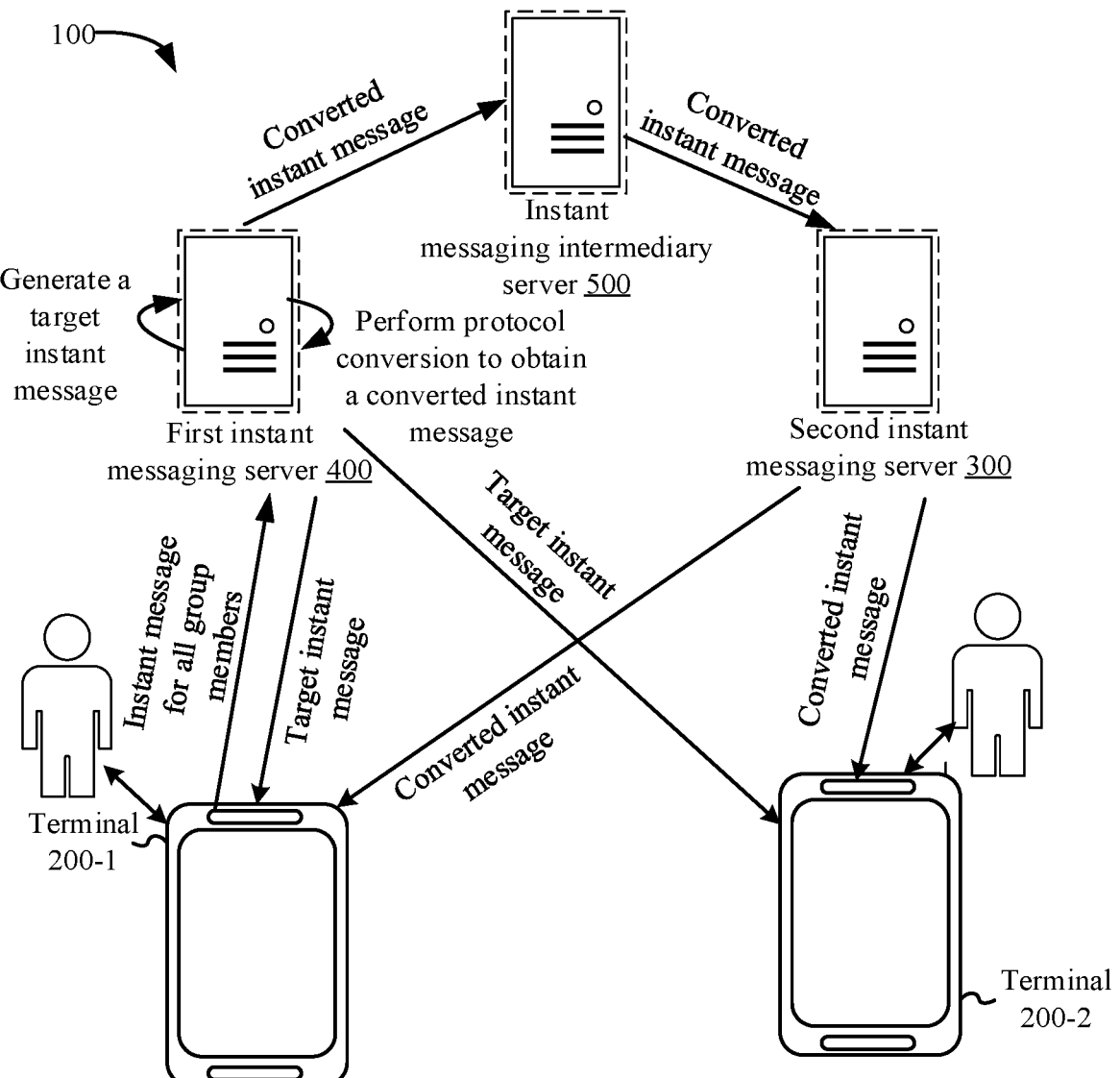
FIG. 1 is a schematic diagram of a network architecture of an instant messaging system according to an embodiment of this disclosure.

In order to make the objectives, technical solutions, and advantages of this disclosure clearer, the following describes this disclosure with reference to the accompanying drawings. The described embodiments are not to be considered as a limitation on this disclosure. Other embodiments and variations shall fall within the scope of this disclosure.

In the following description, the term "some embodiments" describes subsets of all possible embodiments. It may be understood that the term "some embodiments" may be the same subset or different subsets of all the possible embodiments, and can be combined with each other without conflict.

In the following description, the terms "first/second/third" are merely intended to distinguish between similar objects and do not represent a specific order of the objects. It may be understood that the terms "first/second/third" may be interchanged in a specific order or sequential order if allowed, so that the embodiments of this disclosure described herein can be implemented in orders other than those illustrated or described herein.

Unless otherwise defined, all technical and scientific terms used herein have the same meaning as commonly understood by those skilled in the art to which this disclosure belongs. The terms used herein are merely intended to describe examples of the embodiments of this disclosure, but are not intended to limit this disclosure.

Before the embodiments of this disclosure are described, a description is made on nouns and terms in the embodiments of this disclosure. The nouns and terms in the embodiments of this disclosure are applicable to the following explanations.

1) Enterprise instant messaging application may include an enterprise messaging and office tool that serves various enterprises and organizations, has an ability to connect to common instant messaging ecology, and can help enterprises to connect internally, connect to ecological partners, and connect to consumers.

2) Personal instant messaging application may include personal social software that serves the public and is used for shortening communication between people.

In order to understand an instant messaging method according to the embodiments of this application better, an implementation method for transmitting an instant message for everyone or a group announcement message in the related technology is described first.

In a communication group in a personal instant messaging application, a group owner or a group administrator is supported to transmit an instant message for members of the group (for example, everyone) and modify a group announcement. A group announcement message will be triggered at the same time of modification of the group announcement. The two messages are displayed in a highlighted manner, and the group announcement will be displayed on top.

In a communication group in an enterprise instant messaging application, all group members are supported to transmit an instant message for everyone in the group and modify a group announcement. A group announcement message will be transmitted at the same time of modification of the group announcement to notify everyone in the communication group. The two messages are displayed in a highlighted manner.

In the related technology, internal interaction protocols of the enterprise instant messaging application and the personal instant messaging application may not be compatible. In the personal instant messaging application, the instant message for everyone may be attached with a special fixed string, and a personal instant messaging application client understands the fixed string and displays the instant message accordingly. The group announcement message may also be attached with another fixed string, and the personal instant messaging application client understands the fixed string as a group announcement and displays the group announcement accordingly. In the personal instant messaging application, only the group owner and group administrator can modify the group announcement and transmit the instant message for everyone.

In the enterprise instant messaging application, the instant message for everyone may be attached with a specific uint64 identification (ID), and an enterprise instant messaging application client understands the ID and displays the instant message in a highlighted manner. The group announcement message may be attached with a specific flag, and the enterprise instant messaging application client understands the flag and displays the group announcement message in a highlighted manner. In the enterprise instant messaging application, the group member can also modify the group announcement and notify other group members.

An embodiment of this disclosure proposes an instant messaging method. According to the method, on the basis of not changing private protocols of respective internal instant messaging (IM) systems, understanding and protocol conversion are performed at a backend intercommunication message delivery layer, other backend operation logics do not need to be changed, a client does not need to be changed neither, and compatibility can be realized directly. Therefore, compatibility issues between new and old versions of the client are greatly reduced. For operating permissions, capabilities have also been aligned. In a scenario of an intercommunication group, only a group owner and an administrator can modify a group announcement and transmit an instant message for everyone, otherwise a request is directly rejected.

The following describes an exemplary application of a computer device according to the embodiments of this disclosure. The computer device according to the embodiments of this disclosure may be implemented as a server. Next, an exemplary application of the computer device implemented as a server will be described.

Refer to FIG. 1. FIG. 1 is a schematic diagram of a network architecture of an instant messaging system 100 according to an embodiment of this disclosure. As shown in FIG. 1, the system 100 includes terminals (a terminal 200-1 and a terminal 200-2 are exemplarily shown in FIG. 1), a second instant messaging server 300, a first instant messaging server 400, and an instant messaging intermediary server 500. Communication connections are established between the terminal 200-1 and the second instant messaging server 300, between the terminal 200-2 and the second instant messaging server 300, between the terminal 200-1 and the first instant messaging server 400, between the terminal 200-2 and the first instant messaging server 400, between the second instant messaging server 300 and the instant messaging intermediary server 500, and between the first instant messaging server 400 and the instant messaging intermediary server 500 through a network (not shown in FIG. 1). The network may be a wide area network, a local area network, or a combination of a wide area network and a local area network.

In this embodiment of this disclosure, the terminal 200-1 may be installed with an enterprise client corresponding to an enterprise instant messaging application, and may further be installed with a personal client corresponding to a personal instant messaging application. The terminal 200-2 is at least installed with the personal client corresponding to the personal instant messaging application, and may also be installed with the enterprise client corresponding to the enterprise instant messaging application. It is assumed that the terminal 200-1 is a terminal corresponding to a group owner or administrator of a certain first instant messaging group, and the terminal 200-2 is a terminal corresponding to a group member in the first instant messaging group. The terminal 200-1 transmits, through the enterprise instant messaging client, an instant message for all group members to the first instant messaging server 400. After receiving the instant message, the first instant messaging server 400 generates, in a case that it is determined that the terminal 200-1 possesses a permission to transmit the instant message for all group members, a target instant message according to a first instant messaging protocol, and transmits the target instant message to the enterprise client corresponding to each member in the first instant messaging group. In addition, the enterprise server 400 will further perform, according to a second instant messaging protocol, protocol conversion on the instant message to generate a converted instant message, and transmit the converted instant message to the personal client corresponding to each group member in the first instant messaging group. The converted instant message is obtained by adding a fixed string corresponding to an instant message for all group members to the instant message according to the second instant messaging protocol. Therefore, after receiving the converted instant message, the personal client may output the instant message in a first preset style corresponding to an instant message for all group members, and correspondingly, may further output a notification message indicating that the instant message is received. In this way, display of the instant message for all group members that is transmitted through the enterprise client and reminding on the message will be performed at the personal instant messaging client in the same way as the enterprise client. Accordingly, the messaging efficiency can be improved.

In some embodiments, the second instant messaging server 300, the first instant messaging server 400 or the instant messaging intermediary server 500 may be an independent physical server, or may be a server cluster or distributed system including a plurality of physical servers, or may be a cloud server providing basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform. The terminal 200-1 or the terminal 200-2 may be a smartphone, a tablet computer, a notebook computer, a desktop computer, a smart speaker, a smart watch, a vehicle-mounted smart terminal or the like, but is not limited thereto. The terminal and the server may be connected directly or indirectly in a wired or wireless manner, which is not defined in the embodiments of this disclosure.

FIG. 2 is a schematic structural diagram of a first instant messaging server 400 according to an embodiment of this disclosure. The first instant messaging server 400 shown in FIG. 2 includes: at least one processor 410, at least one network interface 420, a bus system 430, and a memory 440. The components in the server 400 are coupled together through the bus system 430. It may be understood that the bus system 430 is configured to implement connection and communication between the components. In addition to a data bus, the bus system 430 further includes a power bus, a control bus, and a state signal bus. However, for ease of clear description, all types of buses in FIG. 2 are marked as the bus system 430.

The processor 410, or processing circuitry, may be an integrated circuit chip capable of processing signals, such as a general-purpose processor, a digital signal processor (DSP), another programmable logic device, a discrete gate or transistor logic device, or a discrete hardware assembly. The general-purpose processor may be a microprocessor, any conventional processor or the like.

The memory 440 may be a removable memory, a non-removable memory, or a combination of a removable memory and a non-removable memory. Exemplarily, the hardware device includes a solid state memory, a hard disk driver, an optical disk driver, and the like. The memory 440 may include one or more storage devices located physically remote from the processor 410.

The memory 440 includes a volatile memory or a non-volatile memory, or may include both a volatile memory and a non-volatile memory. The non-volatile memory may be a read-only memory (ROM), and the volatile memory may be a random access memory (RAM). The memory 440 described in this embodiment of this disclosure is intended to include any suitable type of memory.

In some embodiments, the memory 440 can store data to support various operations. Examples of the data include a program, a module, a data structure, or a subset or superset thereof, which will be described exemplarily below.

An operating system 441 includes system programs used for processing various basic system services and executing hardware-related tasks, such as a framework layer, a core library layer, and a drive layer, and is used for implementing various basic services and processing hardware-based tasks.

A network communication module 442 is configured to be connected to another computing device through one or more (wired or wireless) network interfaces 420. Exemplarily, the network interface 420 includes: Bluetooth, Wi-Fi, a universal serial bus (USB), and the like.

In some embodiments, the apparatus according to the embodiments of this disclosure may be implemented in the form of software. FIG. 2 shows a group chat-based instant messaging apparatus 443 stored in the memory 440. The apparatus may be software in the form of a program, a plug-in or the like, and includes the following software modules: a first receiving module 4431, a first verification module 4432, a first conversion module 4433, and a first transmission module 4434. These modules are logical modules. Therefore, these modules may be combined or divided in various manners according to functions implemented. Functions of the modules will be described below.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

In some other embodiments, the apparatus according to the embodiments of this disclosure may be implemented in the form of hardware. For example, the apparatus according to the embodiments of this disclosure may be a processor, or processing circuitry, in the form of a hardware decoding processor, which is programmed to execute the group chat-based instant messaging method according to the embodiments of this disclosure. For example, the processor in the form of a hardware decoding processor may adopt one or more application-specific integrated circuits (ASICs), a DSP, a programmable logic device (PLD), a complex programmable logic device (CPLD), a field-programmable gate array (FPGA) or another electronic element.

The group chat-based instant messaging method according to the embodiments of this disclosure will be described with reference to the exemplary application and implementation of the server according to the embodiments of this disclosure.

An embodiment of this disclosure provides a group chat-based instant messaging method, which is applied to a computer device. The computer device may be a server. In this embodiment of this disclosure, the computer device may be a first instant messaging server or an enterprise instant messaging server. FIG. 3 is a schematic flowchart of a group chat-based instant messaging method according to an embodiment of this disclosure. Steps of the group chat-based instant messaging method according to this embodiment of this disclosure will be described with reference to FIG. 3.

Step S101: Receive an instant message transmitted by a first instant messaging client in a first instant messaging group.

The first instant messaging client may be an enterprise instant messaging client. The first instant messaging group may be an enterprise instant messaging group, for example, may be an instant messaging group of a certain department of a certain company. In some embodiments, after the first instant messaging client is started, a home page of enterprise instant messaging is displayed. The home page includes access controls of various instant messaging windows. When receiving a trigger operation for a certain access control, the first instant messaging client presents an instant messaging window corresponding to the access control. An instant message, such as a text or a speech, may be inputted through the instant messaging window. In this embodiment of this disclosure, the first instant messaging client may acquire inputted instant messaging content through a chat interface of the first instant messaging group, generate an instant message when receiving a transmission operation, and transmit the instant message to a first instant messaging server. The first instant messaging server is an enterprise instant messaging server.

Step S102: Verify, in a case that it is determined that the instant message is an instant message for all group members, identity information of the first instant messaging client to obtain a first verification result.

Here, after receiving the instant message, the first instant messaging server parses the instant message to obtain instant messaging content, and determines whether the instant messaging content includes a preset string corresponding to an instant message for all group members. In this embodiment of this disclosure, an example in which the preset string is "@everyone" is used for description. In a case that the instant message received by the first instant messaging server includes "@everyone", it is determined that the instant message is an instant message for all group members, and the identity information of the first instant messaging client is verified.

In some embodiments, a user identification corresponding to the first instant messaging client may be acquired first.

The user identification is a unique identification in enterprise instant messaging. Then, the identity information corresponding to the user identification is acquired. The identity information may be one of a group owner, an administrator, an ordinary group member. In this embodiment of this disclosure, it is set that only the group owner or administrator of the first instant messaging group can transmit an instant message for all group members, that is, whether the identity information of the first instant messaging client is the group owner or administrator is determined to obtain the first verification result.

Step S103: Perform, in response to the first verification result indicating verification success, protocol conversion on the instant message to obtain a converted instant message.

In a case that it is determined that the first verification result indicates verification success, it indicates that the first instant messaging client possesses a permission to transmit an instant message for everyone. In this case, a flag may be added to the instant message, so that the enterprise client can detect that the instant message is an instant message for all group members. However, an enterprise instant messaging system and a personal instant messaging system have respective private protocols. According to an enterprise instant messaging protocol (a first instant messaging protocol), a specific identification (ID) will be attached to an instant message for all group members. The specific identification may include a 64-bit unsigned integer or may include a 32-bit unsigned integer. After detecting the ID, the first instant messaging client recognizes that the received instant message is an instant message for all group members. However, according to a personal instant messaging protocol (a second instant messaging protocol), an instant message for all group members is characterized in another form, for example, may be characterized by a specific string "@all". Therefore, in this embodiment of this disclosure, in order to enable a personal instant messaging client (a second instant messaging client) to recognize the instant message for all group members that is transmitted through the enterprise instant messaging client (the first instant messaging client), it is necessary to perform protocol conversion to obtain the converted instant message. The converted instant message is attached with the specific string corresponding to the second instant messaging protocol.

Step S104: Transmit, through a second instant messaging server, the converted instant message to a second instant messaging client corresponding to each group member in the first instant messaging group.

The second instant messaging server is a server corresponding to the second instant messaging client. The first instant messaging client and the second instant messaging client are clients corresponding to two heterogeneous instant messaging systems. For example, the first instant messaging client is an enterprise instant messaging client, and the second instant messaging client is a personal instant messaging client.

In some embodiments, in a case that a direct communication connection is established between the second instant messaging server and the first instant messaging server, the first instant messaging server transmits the converted instant message to the second instant messaging server directly. In this embodiment of this disclosure, the first instant messaging server communicates with the second instant messaging server through an instant messaging intermediary server, the first instant messaging server transmits the converted instant message to the instant messaging intermediary server, and the instant messaging intermediary server transmits the converted instant message to the second instant messaging server.

The second instant messaging server transmits the converted instant message to the second instant messaging client corresponding to each group member in the first instant messaging group. Each second instant messaging client will detect that the converted instant message is an instant message for all group members, and output the converted instant message in a first preset style corresponding to an instant message for all group members. In some embodiments, the second instant messaging client will further output a message reminding notification, for example, may output a prompt tone indicating that an instant message is received.

In the group chat-based instant messaging method according to the embodiments of this disclosure, after a first instant messaging server (an enterprise instant messaging server) receives an instant message transmitted by a first instant messaging client (an enterprise instant messaging client) in a first instant messaging group, in a case that it is determined that the instant message is an instant message for all group members, identity information of the first instant messaging client needs to be verified to obtain a first verification result. In a case that it is determined that the first verification result indicates verification success, protocol conversion is performed on the instant message to obtain a converted instant message. The converted instant message is transmitted, through a second instant messaging server, to a second instant messaging client (a personal instant messaging client) corresponding to each group member in the first instant messaging group. After receiving the converted instant message, the personal instant messaging client may output the instant message in a first preset style corresponding to an instant message for all group members, and correspondingly, may further output a notification message indicating that a new message is received. In this way, display of the instant message for all group members that is transmitted through the enterprise instant messaging client and reminding on the message will be performed at the personal instant messaging client in the same way as the enterprise instant messaging client. That is, unification of message display and reminding on messages can be realized in two heterogeneous instant messaging systems. Accordingly, the messaging efficiency can be improved.

In some embodiments, step S102, related to verifying identity information of the first instant messaging client to obtain a first verification result, may be implemented by the following steps.

Step S1021: Acquire the identity information of the first instant messaging client.

In some embodiments, a user identification of the first instant messaging client may be acquired first. Then, the identity information of the first instant messaging client is acquired based on the user identification. The identity information may include one of a group owner, an administrator, and an ordinary group member.

Step S1022: Determine whether the identity information is a group owner or administrator of the first instant messaging group.

In a case that the identity information characterizes that the first instant messaging client is the group owner or administrator of the first instant messaging group, step S1023 is performed. In a case that the identity information characterizes that the first instant messaging client is not the group owner or administrator of the first instant messaging group, step S1024 is performed.

Step S1023: Determine that the first verification result indicates verification success.

Step S1024: Determine that the first verification result indicates verification failure.

In this embodiment of this disclosure, the identity information of the first instant messaging client is verified by step S1021 to step S1024 to determine whether the first instant messaging client possess a permission to transmit an instant message for all group members. Only in a case that the first instant messaging client possesses the permission, protocol conversion is performed on the instant message, so that rules of the enterprise instant messaging application and the personal instant messaging application can be aligned.

In some embodiments, step S103, related to performing, in response to the first verification result indicating verification success, protocol conversion on the instant message to obtain a converted instant message, may be implemented by the following steps.

Step S1031: Acquire, in response to the first verification result indicating verification success, a corresponding first preset string characterizing an instant message for all group members in a second instant messaging protocol.

In the second instant messaging protocol (for example, a personal instant messaging protocol), an instant message for all group members is characterized by a specific string. In this case, the corresponding first preset string characterizing an instant message for all group members may be acquired based on the second instant messaging protocol. For example, the first preset string may be "atall".

Step S1032: Splice the instant message and the first preset string to generate the converted instant message.

In some embodiments, the first preset string may be spliced to a preset position at the instant message according to the provisions of the second instant messaging protocol. For example, the first preset string may be spliced to the head of the instant message, or the first preset string may be spliced to the end of the instant message, to obtain the converted instant message.

In step S1031 and step S1032, by performing protocol conversion on the instant message for everyone that is transmitted through the enterprise instant messaging client, the personal instant messaging client can accurately determine that the instant message is an instant message for all group members. Then, the personal instant messaging client can also output the converted instant message in the first preset style corresponding to an instant message for all group members, so that unification of displaying of the instant message for all group members and reminding on the instant message for all group members can be realized in two heterogeneous instant messaging systems. Accordingly, the messaging efficiency can be improved.

Figure 4A:
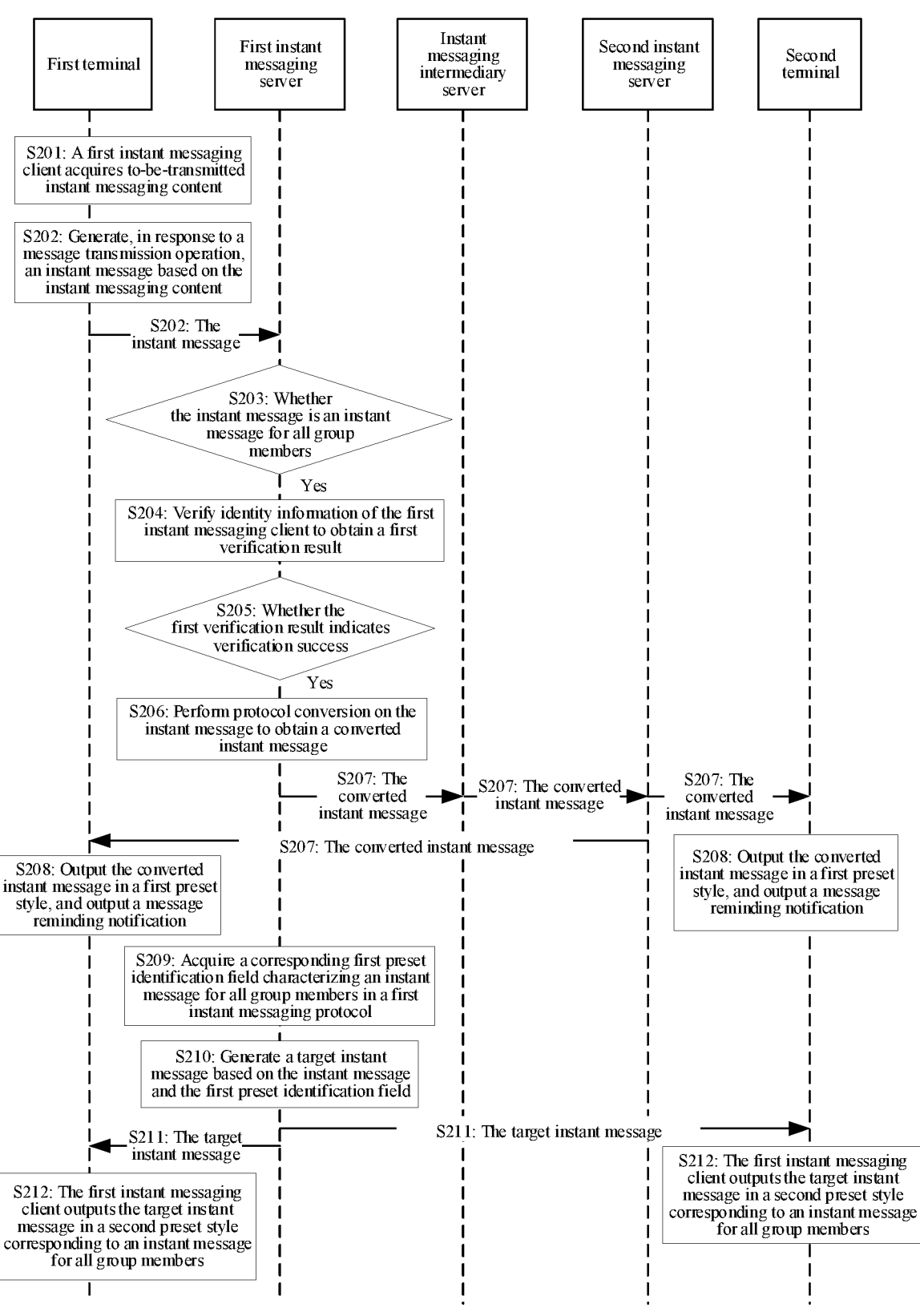
FIG. 4A is a schematic flowchart of another implementation of a group chat-based instant messaging method according to an embodiment of this disclosure.

Based on the foregoing embodiments, an embodiment of this disclosure further provides a group chat-based instant messaging method, which is applied to the network architecture shown in FIG. 1. FIG. 4A is a schematic flowchart of another implementation of a group chat-based instant messaging method according to an embodiment of this disclosure. As shown in FIG. 4A, the process includes:

Step S201: A first instant messaging client in a first terminal acquires to-be-transmitted instant messaging content.

In some embodiments, the to-be-transmitted instant messaging content may be acquired through a chat interface of a first instant messaging group. The instant messaging content may be text content.

Step S202: The first terminal generates, in response to a message transmission operation, an instant message based on the instant messaging content, and transmits the instant message to a first instant messaging server.

A transmission control is presented in the chat interface of the enterprise instant messaging group. A message transmission operation can be triggered through the transmission control. When receiving the message transmission operation, the first terminal generates, in response to the message transmission operation, the instant message based on the instant messaging content, and transmits the instant message to the first instant messaging server.

Step S203: The first instant messaging server determines whether the instant message is an instant message for all group members.

In some embodiments, the first instant messaging server may determine whether the instant message includes a preset string corresponding to an instant message for all group members. The preset string may be "@everyone", "@all" or the like.

In a case that it is determined that the instant message includes the preset string, it is determined that the instant message is an instant message for all group members, and step S204 is performed. In a case that it is determined that the instant message does not include the preset string, it is determined that the instant message is not an instant message for all group members, and step S213 (see FIG. 4B) is performed.

Step S204: The first instant messaging server verifies identity information of the first instant messaging client to obtain a first verification result.

Step S205: The first instant messaging server determines whether the first verification result indicates verification success.

In a case that it is determined that the first verification result indicates verification success, it indicates that the first instant messaging client possesses a permission to transmit an instant message for all group members. In this case, step S206 is performed. In a case that it is determined that the first verification result indicates verification failure, it indicates that the first instant messaging client does not possess the permission to transmit an instant message for all group member. In this case, step S213 (see FIG. 4B) is performed.

Step S206: The first instant messaging server performs protocol conversion on the instant message to obtain a converted instant message.

An implementation process of step S204 and step S206 may be similar to the implementation process of step S102 and step S103, and reference may be made to the implementation process of step S102 and step S103 for an exemplary implementation.

Step S207: The first instant messaging server transmits, through a second instant messaging server, the converted instant message to a second instant messaging client corresponding to each group member in the first instant messaging group.

In this embodiment of this disclosure, the first instant messaging server and the second instant messaging server perform data communication through an instant messaging intermediary server. Therefore, the first instant messaging server transmits the converted instant message to the instant messaging intermediary server first, and then the instant messaging intermediary server transmits the converted instant message to the second instant messaging server. The second instant messaging server transmits the converted instant message to each second instant messaging client.

Step S208: The second instant messaging client outputs the converted instant message in a first preset style and outputs a message reminding notification.

Here, the first preset style is a display style corresponding to an instant message for all group members. For example, the preset string "@everyone" characterizing an instant message for all group members may be displayed in red, and a nickname of the first instant messaging client is displayed. The outputted message reminder may be an outputted prompt tone indicating that an instant message is received.

Step S209: The first instant messaging server acquires a corresponding first preset identification field characterizing an instant message for all group members in a first instant messaging protocol.

In the first instant messaging protocol, a preset identification field is used for characterizing that an instant message is an instant message for all group members. For example, the first preset identification field may be a 64-bit binary digit.

Step S210: The first instant messaging server splices the instant message and the first preset identification field to obtain a target instant message.

In some embodiments, the first preset identification field may be spliced to a preset position at the instant message according to the provisions of the first instant messaging protocol. For example, the first preset identification field may be spliced to the head of the instant message, or the first preset identification field may be spliced to the end of the instant message, to obtain the target instant message.

Step S211: The first instant messaging server transmits the target instant message to the first instant messaging client corresponding to each group member in the first instant messaging group.

In the example shown in FIG. 4A, the first terminal and the second terminal are terminals of the first instant messaging clients corresponding to certain group members.

Step S212: The first instant messaging clients in the first terminal and the second terminal output the target instant message in a second preset style corresponding to an instant message for all group members.

In some embodiments, the target instant message may be displayed in the second preset style in a display area of an access control corresponding to the first instant messaging group at an instant messaging home page of the first instant messaging client. The first preset style in which an instant message for all group members is displayed in a personal instant messaging application may be the same as or different from the second preset style in which an instant message for all group members is displayed in an enterprise instant messaging application.

Step S213: The first instant messaging server transmits the instant message to the first instant messaging client corresponding to each group member in the first instant messaging group.

Step S214: The first instant messaging server transmits, through the second instant messaging server, the instant message to the second instant messaging client corresponding to each group member.

In this embodiment of this disclosure, in a case that the instant message is not for all group members, or is for all group members but the first instant messaging client who transmits the instant message does not possess a transmission permission, the enterprise instant messaging client will not process the instant message but distribute the instant message to each first instant messaging client. Furthermore, the first instant messaging server will transmit, through the second instant messaging server, the instant message to each second instant messaging client.

Step S215: The first instant messaging client and the second instant messaging client in the first terminal and the second terminal output the instant message in default styles.

Figure 4B:
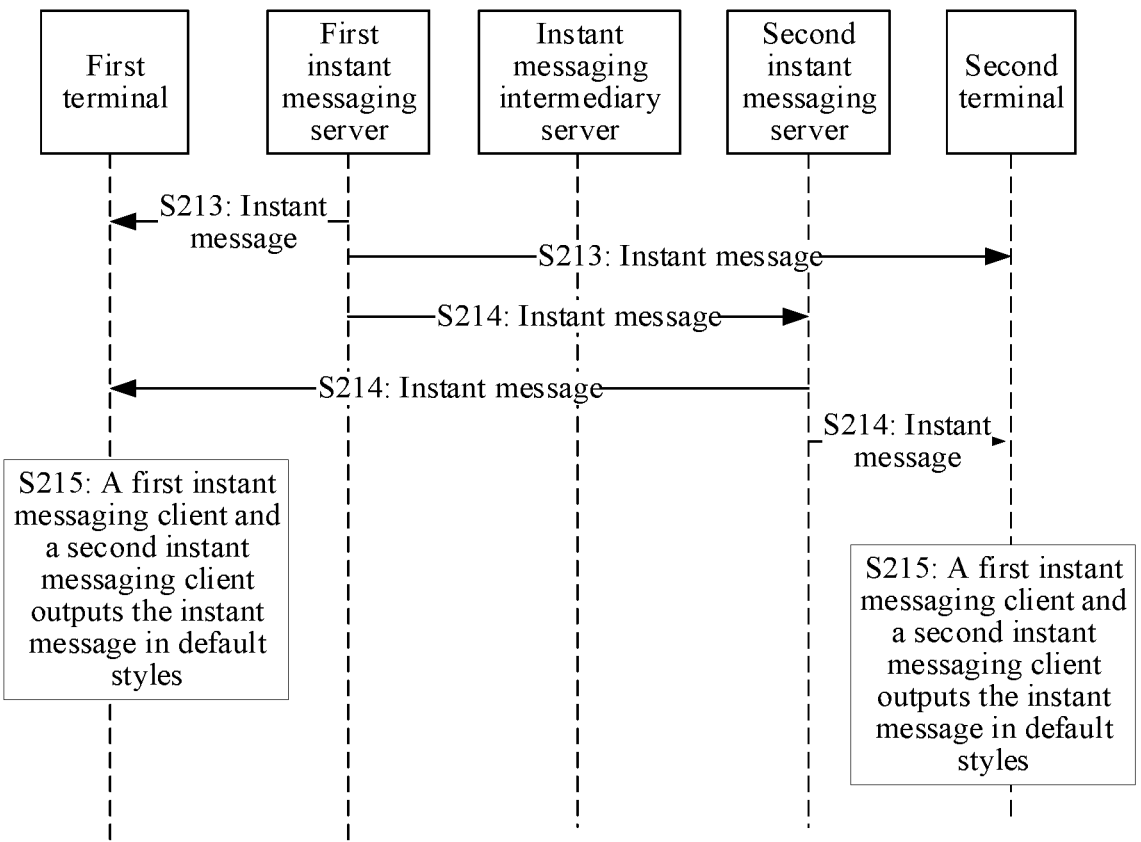
FIG. 4B is a schematic flowchart of still another implementation of a group chat-based instant messaging method according to an embodiment of this disclosure.

Step S213 to step S215 are shown in FIG. 4B.

In the group chat-based instant messaging method according to the embodiments of this disclosure, after acquiring a to-be-transmitted instant message, a first instant messaging client in a first terminal transmits the instant message to a first instant messaging server. After the first instant messaging server receives the instant message, in a case that it is determined that the instant message is an instant message for all group members, identity information of the first instant messaging client needs to be verified to obtain a first verification result, so as to determine whether the first instant messaging client possesses a transmission permission. In a case that it is determined that the first verification result indicates verification success, protocol conversion is performed on the instant message to obtain a converted instant message. The converted instant message is transmitted, through a second instant messaging server, to a second instant messaging client corresponding to each group member in the first instant messaging group. After receiving the converted instant message, a personal client may output the instant message in a first preset style corresponding to an instant message for all group members, and correspondingly, may further output a notification message indicating that the instant message is received. However, in a case that the instant message is not for all group members or the first instant messaging client does not possess the transmission permission, the first instant messaging server distributes the instant message directly. In this way, display of the instant message for all group member that is transmitted through the enterprise client and reminding on the message will be performed at the personal instant messaging client in the same way as the enterprise client, so that missing of a group instant message that needs to be viewed is avoided. Accordingly, the messaging efficiency is improved.

Figure 5:
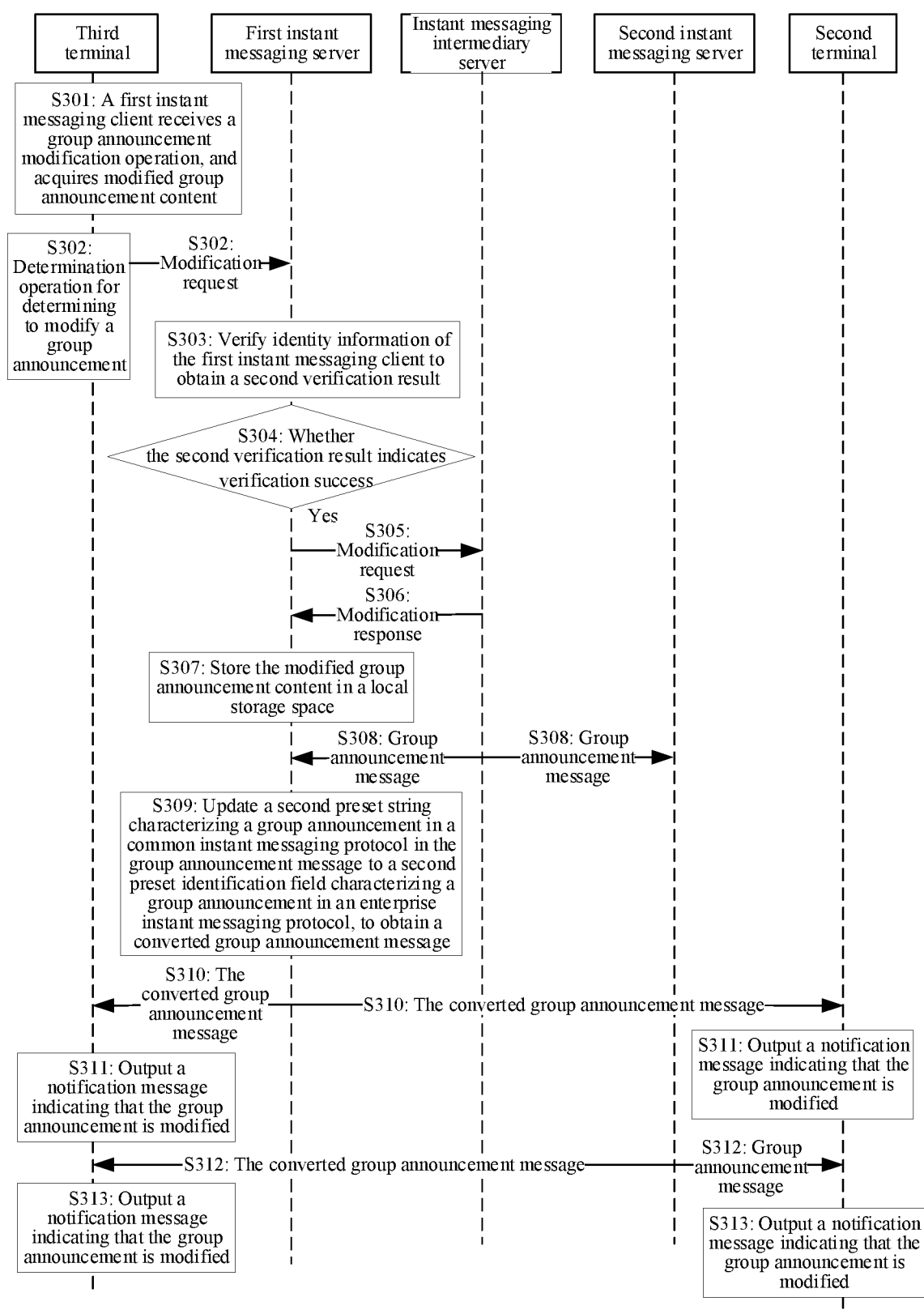
FIG. 5 is a schematic flowchart of yet another implementation of a group chat-based instant messaging method according to an embodiment of this disclosure.

Based on the foregoing embodiments, an embodiment of this disclosure further provides a group chat-based instant messaging method. FIG. 5 is a schematic flowchart of yet another implementation of a group chat-based instant messaging method according to an embodiment of this disclosure. As shown in FIG. 5, the method includes:

Step S301: A first instant messaging client in a third terminal receives a group announcement modification operation, and acquires modified group announcement content.

A group announcement is a notification message that is released by a group owner or administrator of an instant messaging group and that can be viewed by each member in the group. In a case that the group announcement needs to be modified, it is necessary to enter a view interface of the group announcement from a group chat interface first, the group announcement modification operation is received through the view interface of the group announcement, and the modified group announcement content is acquired. The group announcement modification operation may be an operation such as content deletion or content addition.

Step S302: The third terminal transmits, in response to a determination operation for determining to modify the group announcement, a modification request to a first instant messaging server.

The modification request is used for modifying the group announcement. The modification request carries the modified group announcement content.

Step S303: The first instant messaging server verifies identity information of the first instant messaging client to obtain a second verification result.

An implementation process of this step is similar to the implementation process of step S102. Whether the identity information of the first instant messaging client is the group owner or administrator is verified to obtain the second verification result. In a case that the identity information of the first instant messaging client characterizes that the first instant messaging client is the group owner or administrator of the first instant messaging group, the second verification result indicates verification success. In a case that the identity information of the first instant messaging client characterizes that the first instant messaging client is not the group owner or administrator of the first instant messaging group, the second verification result indicates verification failure.

Step S304: The first instant messaging server determines whether the second verification result indicates verification success.

In a case that it is determined that the second verification result indicates verification success, step S305 is performed. In a case that it is determined that the second verification result indicates verification failure, step S314 is performed.

Step S305: The first instant messaging server transmits the modification request to an instant messaging intermediary server.

The instant messaging intermediary server, as a middle service, is configured to complete communication between the first instant messaging server and the second instant messaging server and is responsible for docking of two heterogeneous instant messaging systems.

In some embodiments, the modification request carries the modified group announcement content.

Step S306: After determining that the modification request is received, the instant messaging intermediary server transmits a modification response to the first instant messaging server.

The modification response is used for notifying the first instant messaging server that the instant messaging intermediary server has successfully received the modification request.

Step S307: After receiving the modification response transmitted by the instant messaging intermediary server, the first instant messaging server stores the modified group announcement content in a local storage space.

Step S308: The instant messaging intermediary server transmits a group announcement message to the first instant messaging server and the second instant messaging server.

In this embodiment of this disclosure, after receiving the modification request, the instant messaging intermediary server parses the modification request to obtain the modified group announcement content, and generates the group announcement message based on the modified group announcement content. In some embodiments, the instant messaging intermediary server may generate the group announcement message according to a second instant messaging protocol. According to the second instant messaging protocol (for example, a personal instant messaging protocol), a fixed string is appended to the group announcement content, so that the personal instant messaging client can recognize that the received message is a group announcement message according to the string.

Step S309: The first instant messaging server updates a second preset string characterizing a group announcement in the second instant messaging protocol in the group announcement message to a second preset flag field characterizing a group announcement in a first instant messaging protocol to obtain a converted group announcement message.

The group announcement message distributed by the instant messaging intermediary server is processed according to the second instant messaging protocol. However, according to the first instant messaging protocol (for example, an enterprise instant messaging protocol), a specific flag is appended to the group announcement to characterize a group announcement message. Therefore, in order to ensure that the enterprise client can also recognize the group announcement message, in this step, the first instant messaging server performs protocol conversion on the received group announcement message, to update the second preset string characterizing a group announcement in the second instant messaging protocol in the group announcement message to the second preset flag field characterizing a group announcement in the first instant messaging protocol, so as to obtain the converted group announcement message.

Step S310: The first instant messaging server transmits the converted group announcement message to the first instant messaging client corresponding to each group member in the first instant messaging group.

In this embodiment of this disclosure, it is assumed that a first terminal and the third terminal are two terminals corresponding to the first instant messaging clients in the first instant messaging group. Therefore, in this step, it may be understood that the first instant messaging server transmits the converted group announcement message to the first terminal and the third terminal.

Step S311: After receiving the converted group announcement message, the first terminal and the third terminal output a notification message indicating that the group announcement is modified.

Because the converted group announcement message conforms to the first instant messaging protocol, each first instant messaging client can recognize that the message is a group announcement message, and output the notification message indicating that the group announcement is modified in a third preset style corresponding to a group announcement message. For example, the notification message may be displayed in a highlighted manner at the top of a chat interface of the first instant messaging group.

Step S312: The second instant messaging server transmits the received group announcement message to a second instant messaging client corresponding to each group member in the first instant messaging group.

The group announcement message is transmitted to the second instant messaging client, and actually, is transmitted to a terminal corresponding to each second instant messaging client. In FIG. 5, an example in which the terminals corresponding to the second instant messaging clients are the first terminal and the third terminal is shown.

Step S313: After receiving the converted group announcement message, the first terminal and the third terminal output a notification message indicating that the group announcement is modified.

In some embodiments, the notification message indicating that the group announcement is modified may be outputted in a fourth preset style corresponding to a group announcement message that is specified in the second instant messaging protocol. For example, the notification message may be displayed in a highlighted manner at the top of the chat interface of the first instant messaging group.

Step S314: The first instant messaging server transmits a notification message indicating modification failure to the first instant messaging client.

The notification message is used for prompting that the first instant messaging client does not possess a permission to modify the group announcement.

In the group chat-based instant messaging method according to the embodiments of this disclosure, after modifying a group announcement through a first instant messaging client, a third terminal transmits a modification request to a first instant messaging server. The first instant messaging server transmits the modification request to an instant messaging intermediary server, and stores modified group announcement content in a local storage space. The instant messaging intermediary server distributes a group announcement message to the first instant messaging server and a second instant messaging server. The group announcement message is generated according to a second instant messaging protocol. Therefore, after receiving the group announcement message, the first instant messaging server performs protocol conversion on the group announcement message to obtain a converted group announcement message, and transmits the converted group announcement message to a terminal corresponding to each first instant messaging client. The second instant messaging server will also transmit the group announcement message to a terminal in which a second instant messaging client corresponding to each group member in the first instant messaging group is located. In this way, it is ensured that the group announcement message modified through the enterprise client can be displayed in a highlighted manner at both the enterprise client and the personal client. Furthermore, a group announcement notification message is outputted to ensure that the group announcement message can be read in time. Therefore, the passing efficiency of the group announcement message is improved.

Next, an exemplary application of the embodiments of this disclosure in an actual application scenario will be described.

Figure 6A:
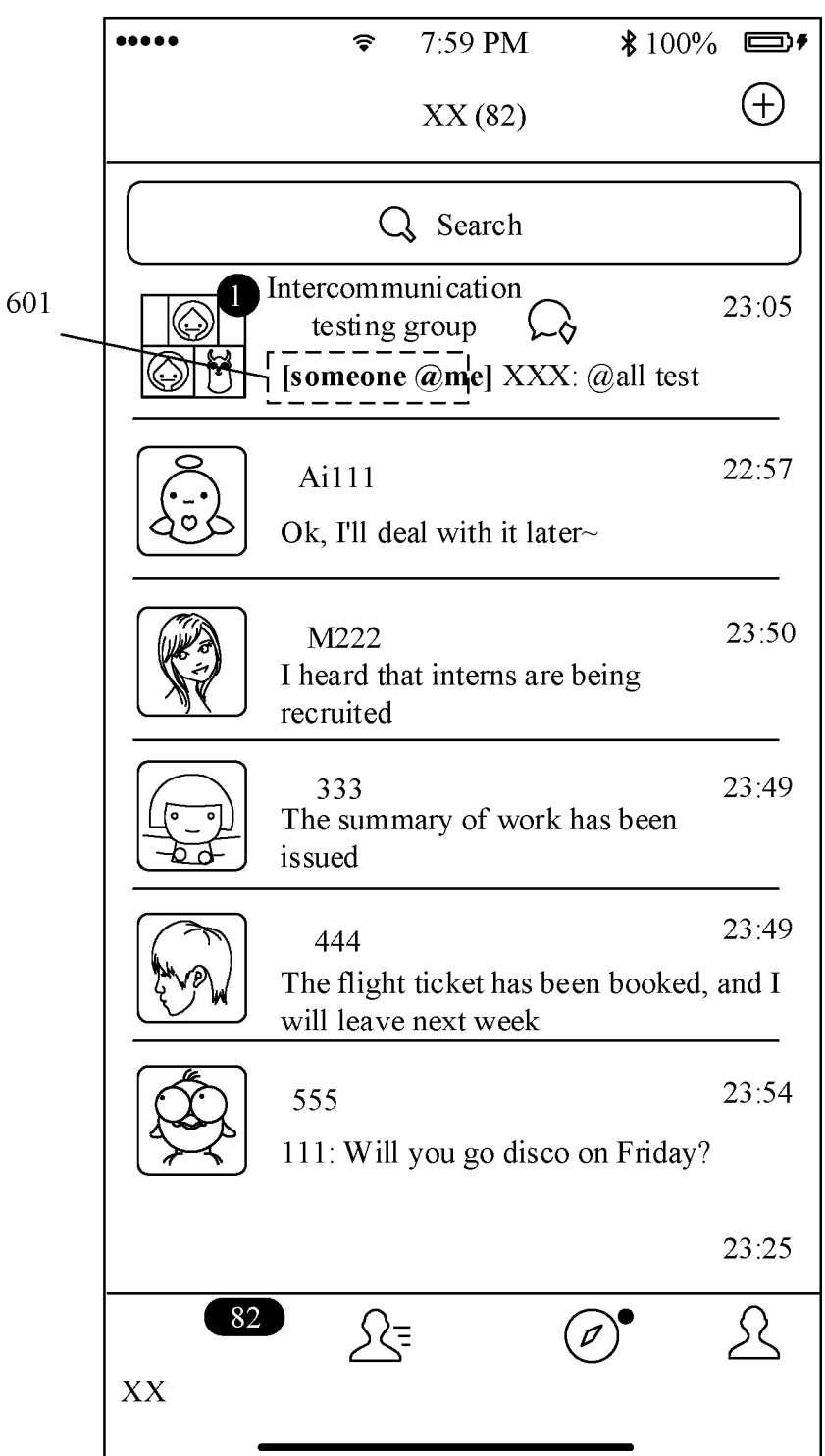
FIG. 6A is a schematic diagram of an interface displaying an instant message for all group members in a first instant messaging group at a personal instant messaging client according to an embodiment of this disclosure.
Figure 6B:
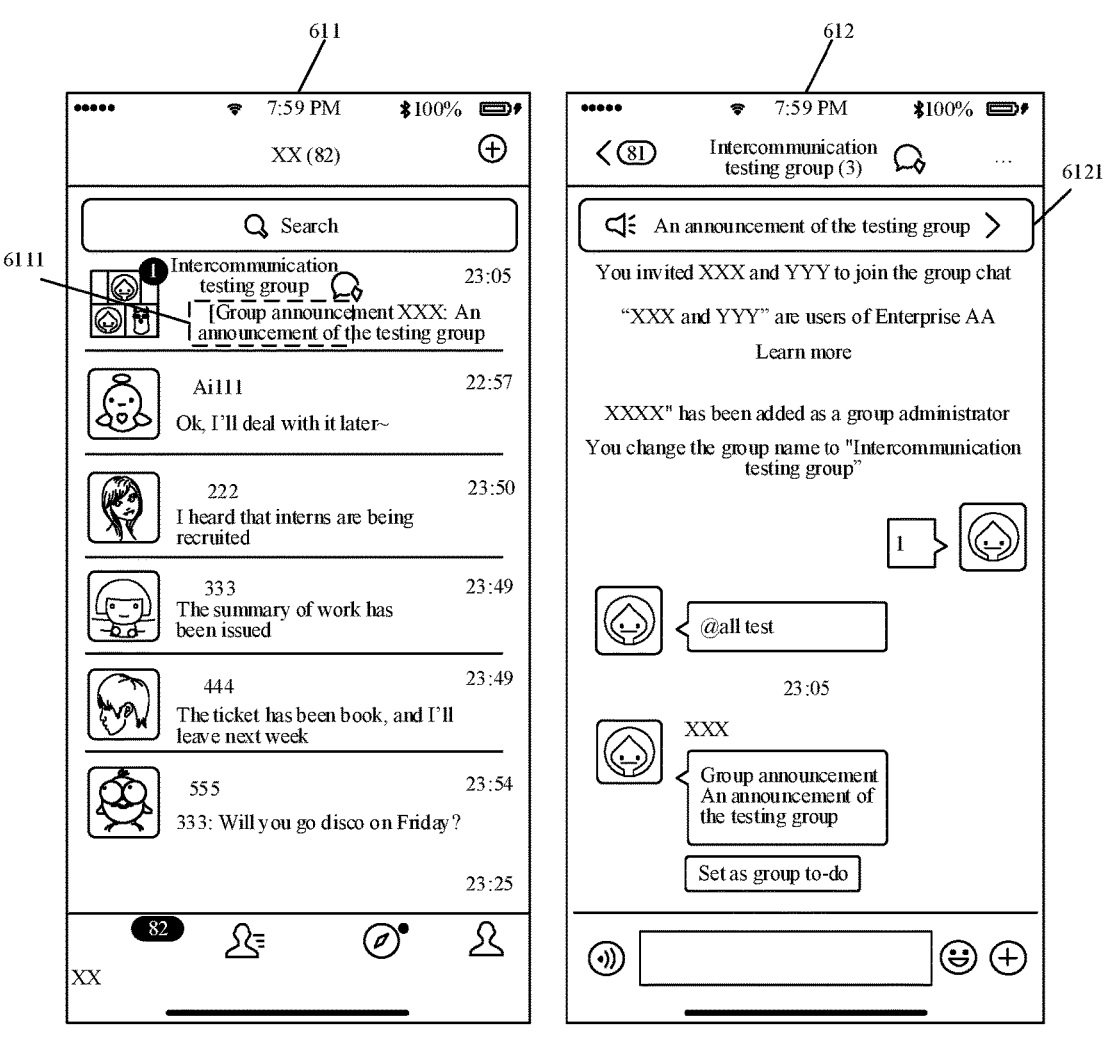
FIG. 6B is a schematic diagram of an interface displaying a group announcement of a first instant messaging group at a personal instant messaging client according to an embodiment of this disclosure.

An embodiment of this disclosure provides a group chat-based instant messaging method. By the instant messaging method, a group owner of a messaging group in an enterprise instant messaging application initiates an instant message for everyone. As shown in FIG. 6A, a highlighted instant message 601 for everyone can be viewed by other group members at personal instant messaging clients. Only the group owner and the group administrator have access to transmit an instant message for everyone. As shown in FIG. 6B, the group owner on an enterprise instant messaging side modifies a group announcement, other group members on a personal instant messaging side can see a highlighted group announcement message 6111 at a home page 611 of personal instant messaging. Furthermore, a group announcement 6121 is displayed at the top of a group chat interface 612. Only the group owner and the group administrator have access to modify the group announcement.

A technology implementation process of the instant messaging method according to the embodiments of this disclosure will be described below.

Figure 7:
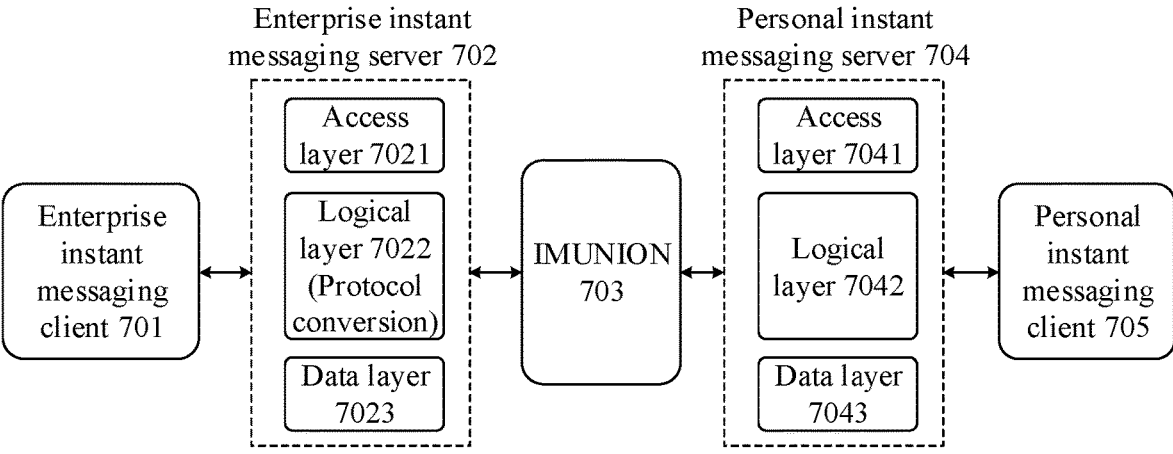
FIG. 7 is a schematic diagram of an instant messaging system to which an instant messaging method is applied according to an embodiment of this disclosure.

FIG. 7 is a schematic diagram of an instant messaging system to which an instant messaging method is applied according to an embodiment of this disclosure. As shown in FIG. 7, the instant messaging system includes: an enterprise instant messaging client 701, an enterprise instant messaging server 702, an instant messaging intermediary server (IMUnion) 703, a personal instant messaging server 704, and a personal instant messaging client 705. The enterprise instant messaging server 702 includes an access layer 7021, a logical layer 7022, and a data layer 7023. The personal instant messaging server 704 includes an access layer 7041, a logical layer 7042, and a data layer 7043.

The enterprise instant messaging client 701 may initiate an instant message for everyone and a group announcement. The enterprise instant messaging client 701 may also receive an enterprise instant message. IMUnion 703, as a middle server, is configured to connect the personal instant messaging server to the enterprise instant messaging server and is responsible for docking of two heterogeneous IM systems. The access layer 7021 of the enterprise instant messaging server 702 and the access layer 7041 of the personal instant messaging server 704 are responsible for docking with IMUnion and receiving and transmission of request based on the Hypertext Transfer Protocol (HTTP). The logical layer 7022 of the enterprise instant messaging server 702 processes internal logics, such as message passing and protocol conversion, of an enterprise instant messaging application. Distribution and conversion of an instant message for all group members and a group announcement message are processed by the logical layer 7022.

An implementation process of the instant messaging method according to the embodiments of this disclosure will be described below with reference to FIG. 7.

The enterprise instant messaging client 701 initiates an instant message @everyone. The logical layer 7022 of the enterprise instant messaging server 702 performs permission verification and protocol conversion to convert an internal private protocol of the enterprise instant messaging application into a protocol defined by a personal instant messaging application. Through an intercommunication channel of IMUnion, the instant message @everyone is delivered to the personal instant messaging server 704. The personal instant messaging server 704 reuses the existing logic directly and delivers message data to the personal instant messaging client 705. The personal instant messaging client 705 can display a highlighted style.

Figure 8:
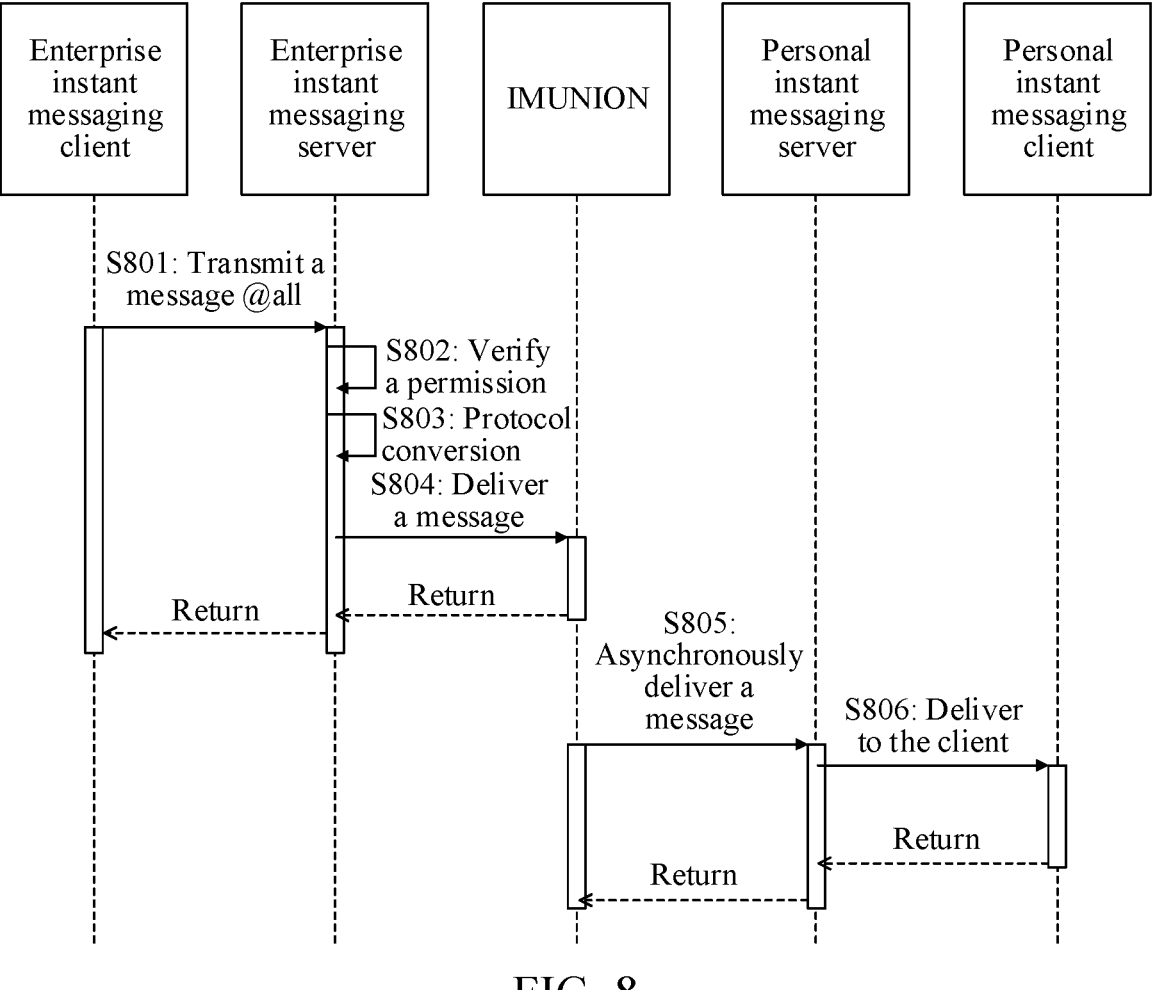
FIG. 8 is a sequence diagram of an implementation process of another instant messaging method according to an embodiment of this disclosure.

FIG. 8 is a sequence diagram of an implementation process of another instant messaging method according to an embodiment of this disclosure, which is applied to a scenario of transmission of an instant message for all group members. The implementation process will be described below with reference to FIG. 8.

Step S801: A group owner or administrator at an enterprise instant messaging client initiates an instant message for all group member.

The instant message for all group members may be an instant message with a message head "@all". Exemplarily, the instant message for all group members may be "@all please come to the meeting room at three o'clock this afternoon for a meeting".

Step S802: An enterprise instant messaging backend checks a permission.

In some embodiments, the enterprise instant messaging backend detects whether a transmitter of the instant message for all group members is the group owner or administrator. In a case that the transmitter is not the group owner or administrator, it indicates that the transmitter does not possess a permission to transmit an instant message for all group members. In this case, protocol conversion in the following step is not performed, and the instant message is transmitted as an ordinary instant messaging group message. In a case that the transmitter is the group owner or administrator, step S803 is performed.

Step S803: An enterprise instant messaging server performs protocol conversion.

In some embodiments, a logical layer of the enterprise instant messaging server converts an ID that is a 64-bit unsigned integer and that characterizes an instant message for all group members in the enterprise instant message into a preset string characterizing a group message for everyone in personal instant messaging.

Step S804: The enterprise instant messaging server transmits the converted instant message to IMUnion.

Step S805: IMUnion transmits the converted instant message to a personal instant messaging server.

Step S806: The personal instant messaging server delivers the converted instant message to a personal instant messaging client.

In some embodiments, after receiving the converted instant message, the personal instant messaging server can recognize that the message is an instant message for all group members directly without processing additional logics.

In this embodiment of this disclosure, after receiving the instant message for all group members, the personal instant messaging client highlights the instant message to remind all the members in the group.

Figure 9:
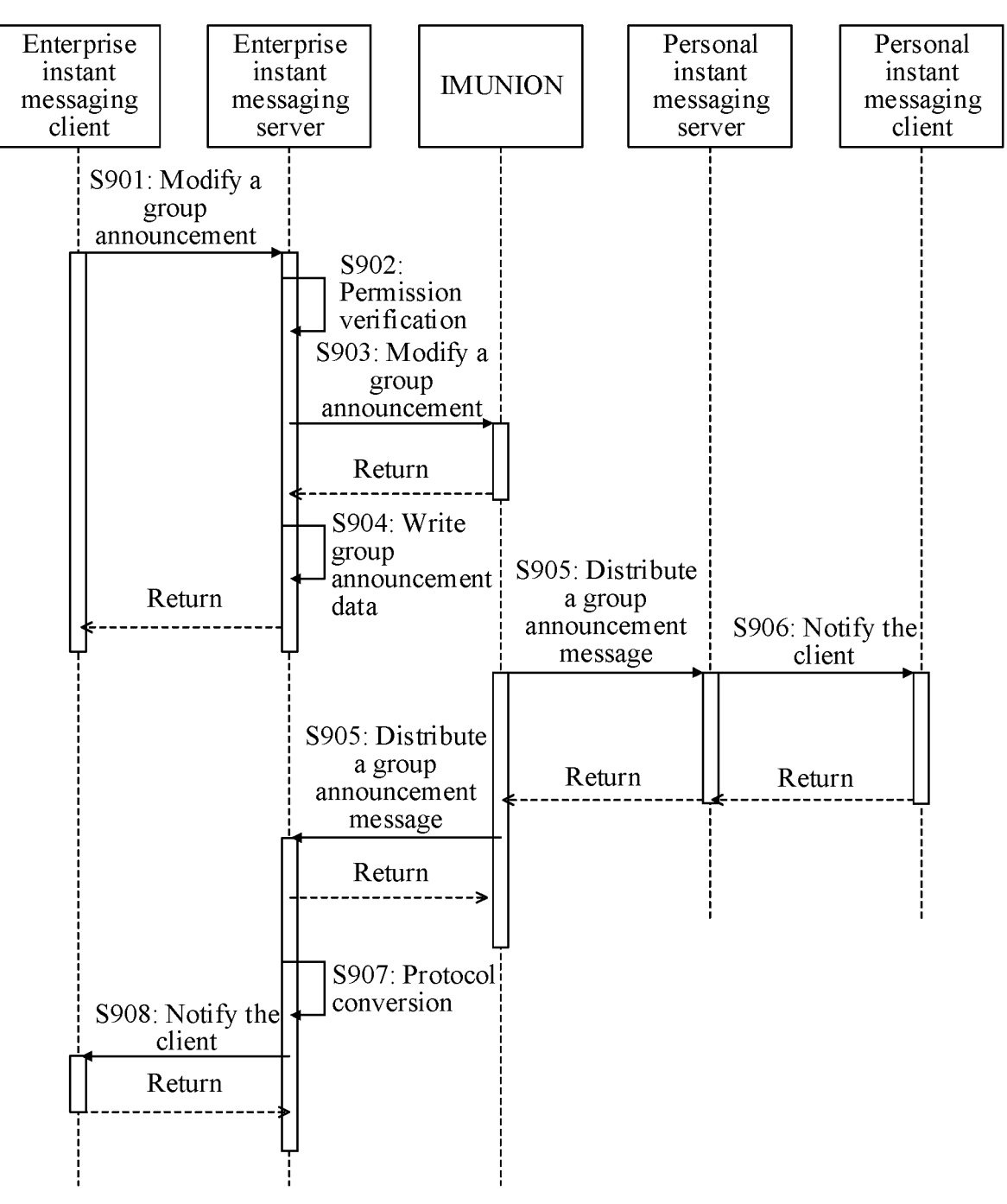
FIG. 9 is a sequence diagram of another implementation process of an instant messaging method according to an embodiment of this disclosure.

FIG. 9 is a sequence diagram of another implementation process of an instant messaging method according to an embodiment of this disclosure, which is applied to a scenario in which an enterprise instant messaging client modifies a group announcement. Steps of the process will be described below with reference to FIG. 9.

Step S901: An enterprise instant messaging client initiates a group announcement modification request to an enterprise instant messaging server.

Step S902: The enterprise instant messaging server authenticates the group announcement modification request.

The enterprise instant messaging server determines whether the group announcement modification request is initiated by a group owner or administrator of a group, and refuses to process in a case that it is determined that the group announcement modification request is not initiated by the group owner or administrator. In a case that it is determined that the group announcement modification request is initiated by the group owner or administrator, step S903 is performed.

Step S903: The enterprise instant messaging server initiates the group announcement modification request to IMUnion.

In some embodiments, the group announcement modification request includes modified group announcement content.

Step S904: The enterprise instant messaging server stores group announcement data in a local storage space.

In some embodiments, after receiving a modification response for the group announcement modification request that is transmitted by IMUnion, the enterprise instant messaging server stores the group announcement data in the local storage space. Here, the group announcement data refers to group announcement content.

Step S905: IMUnion synchronizes an updated message of the group announcement to the enterprise instant messaging server and a personal instant messaging server.

In some embodiments, after receiving the group announcement modification request, IMUnion parses the group announcement modification request to obtain the modified group announcement content, and generates the updated message of the group announcement based on the modified group announcement content. IMUnion may generate the updated message of the group announcement according to a personal instant messaging protocol, or may generate the updated message of the group announcement according to an enterprise instant messaging protocol. In this embodiment of this disclosure, an example in which IMUnion generates the updated message of the group announcement according to the personal instant messaging protocol is used for description.

Step S906: After receiving the updated message of the group announcement, the personal instant messaging server delivers the updated message as an internal message protocol of personal instant messaging to a client.

Because the updated message of the group announcement is generated according to the personal instant messaging protocol, in this step, after receiving the updated message of the group announcement, the personal instant messaging server can deliver the updated message to the client directly without performing protocol conversion on the updated message of the group announcement.

Step S907: After receiving the updated message of the group announcement, the enterprise instant messaging server performs protocol conversion on the updated message to obtain a converted updated message.

Similarly, because the updated message of the group announcement is generated according to the personal instant messaging protocol, in this step, after receiving the updated message of the group announcement, the enterprise instant messaging server may convert a fixed string characterizing an updated message of a group announcement on the personal instant messaging side into a flag field characterizing a group announcement in the enterprise instant messaging protocol.

Step S908: The enterprise instant messaging server transmits the converted updated message to an enterprise instant messaging client.

After receiving the group announcement message, the enterprise instant messaging client highlights the group announcement message based on the flag characterizing that the message is a group announcement message. Furthermore, the enterprise instant messaging client will output a message reminder.

In some embodiments, IMUnion may generate the updated message of the group announcement according to the enterprise instant messaging protocol. In this case, after receiving the updated message of the group announcement, the personal instant messaging server converts the group announcement message according to the personal instant messaging protocol to obtain a converted updated message, and transmits the converted updated message to a personal instant messaging client. After receiving the updated message of the group announcement, the enterprise instant messaging server delivers the updated message of the group announcement directly to the enterprise instant messaging client without performing protocol conversion.

In the group chat-based instant messaging method according to the embodiments of this disclosure, through protocol understanding and protocol conversion of the enterprise instant messaging protocol and the personal instant messaging protocol, alignment of a group message for all group members and a group announcement is realized in two heterogeneous instant messaging systems at the minimum alteration cost. Accordingly, message passing can be more efficient.

It may be understood that in the embodiments of this disclosure, the content related to user information, such as a user identification, instant messaging content, and other relevant data, requires user permission or consent when the embodiments of this disclosure are applied to an actual product or technology. Furthermore, collection, use, and processing of the relevant data need to comply with relevant laws and regulations and standards of relevant countries and regions.

The following describes an exemplary structure of the group chat-based instant messaging apparatus 443 according to the embodiments of this disclosure that is implemented as software modules. In some embodiments, as shown in FIG. 2, the software modules in the group chat-based instant messaging apparatus 443 stored in the memory 440 may include a first receiving module 4431, configured to receive an instant message transmitted by a first instant messaging client in a first instant messaging group; a first verification module 4432, configured to verify, in a case that it is determined that the instant message is an instant message for all group members, identity information of the first instant messaging client to obtain a first verification result; a first conversion module 4433, configured to perform, in response to the first verification result indicating verification success, protocol conversion on the instant message to obtain a converted instant message; and a first transmission module 4434, configured to transmit, through a second instant messaging server, the converted instant message to a second instant messaging client corresponding to each group member in the first instant messaging group, the second instant messaging client outputting the converted instant message in a first preset style corresponding to an instant message for all group members.

In some embodiments, the first verification module 4432 is further configured to acquire the identity information of the first instant messaging client, determine, in response to the identity information characterizing that the first instant messaging client is a group owner or administrator of the first instant messaging group, that the first verification result indicates verification success, and determine, in response to the identity information characterizing that the first instant messaging client is not the group owner or administrator of the first instant messaging group, that the first verification result indicates verification failure.

In some embodiments, the first conversion module 4433 is further configured to acquire, in response to the first verification result indicating verification success, a corresponding first preset string characterizing an instant message for all group members in a second instant messaging protocol, and splice the instant message and the first preset string to obtain the converted instant message.

In some embodiments, the apparatus further includes a first acquisition module, configured to acquire, in response to the first verification result indicating verification success, a corresponding first preset identification field characterizing an instant message for all group members in a first instant messaging protocol; a first generation module, configured to splice the instant message and the first preset identification field to obtain a target instant message; and a second transmission module, configured to transmit the target instant message to the first instant messaging client corresponding to each group member in the first instant messaging group, the first instant messaging client outputting the target instant message in a second preset style corresponding to an instant message for all group members.

In some embodiments, the apparatus further includes a third transmission module, configured to transmit, in response to the first verification result indicating verification failure, the instant message to the first instant messaging client corresponding to each group member and the second instant messaging client corresponding to each group member in the first instant messaging group, the first instant messaging client and the second instant messaging client outputting the instant message in default styles.

In some embodiments, the apparatus further includes a second receiving module, configured to receive a modification request transmitted by a first instant messaging client in the first instant messaging group, the modification request being used for modifying a group announcement, and the modification request carrying modified group announcement content; a second verification module, configured to verify identity information of the first instant messaging client to obtain a second verification result; a fourth transmission module, configured to transmit, in response to the second verification result indicating verification success, the modification request to an instant messaging intermediary server; and a storage module, configured to store the modified group announcement content in a local storage space after a modification response transmitted by the instant messaging intermediary server is received.

In some embodiments, the apparatus further includes a third receiving module, configured to receive a group announcement message transmitted by the instant messaging intermediary server; a second conversion module, configured to update a second preset string characterizing a group announcement in the second instant messaging protocol in the group announcement message to a second preset flag field characterizing a group announcement in the first instant messaging protocol to obtain a converted group announcement message; and a fourth transmission module, configured to transmit the converted group announcement message to the first instant messaging client corresponding to each group member in the first instant messaging group, the first instant messaging client outputting a notification message indicating that the group announcement is modified after receiving the converted group announcement message.

In some embodiments, the apparatus further includes a fifth transmission module, configured to transmit, in response to the second verification result indicating verification failure, a notification message indicating modification failure to the first instant messaging client, the notification message being used for indicating that the first instant messaging client does not possess a permission to modify the group announcement.

The description of the group chat-based instant messaging apparatus according to the embodiments of this disclosure is similar to the description of the foregoing method embodiments, and the apparatus embodiments have beneficial effects similar to those of the method embodiments. Reference may be made to the description of the method embodiments of this disclosure for exemplary technical details of the apparatus embodiments of this disclosure.

An embodiment of this disclosure provides a computer program product or computer program, which includes computer instructions. The computer instructions are stored in a computer-readable storage medium. A processor of a computer device reads the computer instructions from the computer-readable storage medium and executes the computer instructions, and the computer device is enabled to perform the foregoing group chat-based instant messaging method according to the embodiments of this disclosure.

An embodiment of this disclosure provides a computer-readable storage medium, such as a non-transitory computer-readable storage medium, which stores executable instructions that, when executed by a processor, cause the processor to perform the group chat-based instant messaging method according to the embodiments of this disclosure, such as the group chat-based instant messaging method shown in FIG. 3, FIG. 4A or FIG. 5.

In some embodiments, the computer-readable storage medium may be a memory such as a ferroelectric random-access memory (FRAM), a read-only memory (ROM), a programmable read-only memory (PROM), an erasable programmable read-only memory (EPROM), an electrically erasable programmable read-only memory (EEPROM), a flash memory, a magnetic surface memory, an optical disk or a compact disc read-only memory (CD-ROM); or may be any device including one or any combination of the foregoing memories.

In some embodiments, the executable instructions may be in the form of a program, software, a software module, a script or code, which is written in any form of programming language (including a compiled or interpreted language, or a declarative or procedural language). Furthermore, the executable instructions may be deployed in any form, including as a stand-alone program or as a module, component, subroutine or another unit suitable for use in a computing environment.

For example, the executable instructions may, but do not necessarily, correspond to files in a file system, and may be stored as part of files that hold other programs or data. For example, the executable instructions may be stored in one or more scripts in a Hyper Text Markup Language (HTML) document, in a single file specifically used for the program of interest, or in a plurality of collaborative files (such as files storing one or more modules, submodules or code parts).

For example, the executable instructions may be deployed in a computer device for execution, or in a plurality of computer devices located at the same site for execution, or a plurality of computer devices distributed at a plurality of sites and interconnected through a communication network for execution.

The foregoing descriptions are merely exemplary embodiments of this disclosure, and are not intended to limit the scope of protection of this disclosure. Any modification, equivalent replacement, improvement or the like shall fall within the scope of this disclosure.

What is claimed is:

1. A group chat-based instant messaging method, comprising:

receiving a message from a first messaging application of a first user in a first messaging group, the first messaging application being associated with a first messaging service;

determining, when the message is to be announced to all group members of the first messaging group, whether the first user is authorized to send the message based on identity information of the first user;

performing, based on the first user being authorized to send the message to be announced to all group members, protocol conversion on the message based on a second messaging protocol of a second messaging service to output the message in a first preset announcement style for messages announced to all group members, the second messaging protocol of the second messaging service being different from a first messaging protocol of the first messaging service, the protocol conversion being configured to add a first preset string to the message, the first preset string being configured to cause the message to be announced to all the group members in the first preset announcement style according to the second messaging protocol, wherein a display style of the message in the first preset announcement style is different from a display style of the message when the first preset string is not included in the message; and transmitting, via a second messaging server, the converted message to a second messaging application corresponding to one of the group members in the first messaging group.

2. The method according to claim 1, wherein the determining whether the first user is authorized comprises:

acquiring the identity information of the first user in the first messaging service;

determining, in response to the identity information indicating that the first user is a group owner or an administrator of the first messaging group, that the first user is authorized to send the message to be announced to all group members of the first messaging group; and determining, in response to the identity information indicating that the first messaging application is not the group owner or the administrator of the first messaging group, that the first user is not authorized to send the message to be announced to all group members of the first messaging group.

3. The method according to claim 1, wherein the performing the protocol conversion comprises:

generating the converted message by adding the first preset string to the message.

4. The method according to claim 3, further comprising:

acquiring, based on the first user being authorized to send the message to be announced to all group members, corresponding first preset identification information that indicates the message is to be announced to all group members in the first messaging protocol and output in a second preset style for messages announced to all group members;

generating a target message by adding the first preset identification information to the message; and transmitting the target message to the first messaging application of one of the group members in the first messaging group.

5. The method according to claim 1, further comprising:

transmitting, based on the first user not being authorized to send the message to be announced to all group members, the message to the first messaging application corresponding to a first group member of the group members and the second messaging application corresponding to a second group member of the group members in the first messaging group to be output in default message styles.

6. The method according to claim 1, further comprising:

receiving a modification request from the first messaging application of the first user in the first messaging group to modify a group announcement, the modification request including modified group announcement content;

determining whether the first user is authorized to modify the group announcement;

transmitting, based on the first user being authorized to modify the group announcement, the modification request to a messaging intermediary server; and receiving a modification response that includes the modified group announcement content from the messaging intermediary server.

7. The method according to claim 6, further comprising:

receiving a modified group announcement message from the messaging intermediary server;

converting the modified group announcement message by modifying second preset information indicating a group announcement in the second messaging protocol
in the modified group announcement message to sec-
ond preset flag information indicating the group
announcement in the first messaging protocol; and
transmitting the converted group announcement message
to the first messaging application corresponding to a
first group member of the group members in the first
messaging group, the first messaging application being
configured to output a notification message indicating
that the group announcement is modified after receiv-
ing the converted group announcement message.

8. The method according to claim 6, further comprising:
transmitting, based on the first user not being authorized
to modify the group announcement, a notification mes-
sage indicating modification failure to the first messag-
ing application, the notification message indicating that
modification of the group announcement is not permit-
ted.

9. An information processing apparatus, comprising:
processing circuitry configured to:
receive a message from a first messaging application of
a first user in a first messaging group, the first
messaging application being associated with a first
messaging service;
determine, when the message is to be announced to all
group members of the first messaging group,
whether the first user is authorized to send the
message based on identity information of the first
user;
perform, based on the first user being authorized to
send the message to be announced to all group
members, protocol conversion on the message based
on a second messaging protocol of a second mes-
saging service to output the message in a first preset
announcement style for messages announced to all
group members, the second messaging protocol of
the second messaging service being different from a
first messaging protocol of the first messaging ser-
vice, the protocol conversion being configured to add
a first preset string to the message, the first preset
string being configured to cause the message to be
announced to all the group members in the first
preset announcement style according to the second
messaging protocol, wherein a display style of the
message in the first preset announcement style is
different from a display style of the message when
the first preset string is not included in the message;
and
transmit, via a second messaging server, the converted
message to a second messaging application corre-
sponding to one of the group members in the first
messaging group.

10. The information processing apparatus according to
claim 9, wherein the processing circuitry is configured to:
acquire the identity information of the first user in the first
messaging service;
determine, in response to the identity information indi-
cating that the first user is a group owner or an
administrator of the first messaging group, that the first
user is authorized to send the message to be announced
to all group members of the first messaging group; and
determine, in response to the identity information indi-
cating that the first messaging application is not the
group owner or the administrator of the first messaging
group, that the first user is not authorized to send the
message to be announced to all group members of the
first messaging group.

11. The information processing apparatus according to
claim 9, wherein the processing circuitry is configured to:
generate the converted message by adding the first preset
string to the message.

12. The information processing apparatus according to
claim 11, wherein the processing circuitry is configured to:
acquire, based on the first user being authorized to send
the message to be announced to all group members,
corresponding first preset identification information
that indicates the message is to be announced to all
group members in the first messaging protocol and
output in a second preset announcement style for
messages announced to all group members;
generate a target message by adding the first preset
identification information to the message; and
transmit the target message to the first messaging appli-
cation of one of the group members in the first mes-
saging group.

13. The information processing apparatus according to
claim 9, wherein the processing circuitry is configured to:
transmit, based on the first user not being authorized to
send the message to be announced to all group mem-
bers, the message to the first messaging application
corresponding to a first group member of the group
members and the second messaging application corre-
sponding to a second group member of the group
members in the first messaging group to be output in
default message styles.

14. The information processing apparatus according to
claim 9, wherein the processing circuitry is configured to:
receive a modification request from the first messaging
application of the first user in the first messaging group
to modify a group announcement, the modification
request including modified group announcement con-
tent;
determine whether the first user is authorized to modify
the group announcement;
transmit, based on the first user being authorized to
modify the group announcement, the modification
request to a messaging intermediary server; and
receive a modification response that includes the modified
group announcement content from the messaging inter-
mediary server.

15. The information processing apparatus according to
claim 14, wherein the processing circuitry is configured to:
receive a modified group announcement message from the
messaging intermediary server;
convert the modified group announcement message by
modifying second preset information indicating a
group announcement in the second messaging protocol
in the modified group announcement message to sec-
ond preset flag information indicating the group
announcement in the first messaging protocol; and
transmit the converted group announcement message to
the first messaging application corresponding to a first
group member of the group members in the first
messaging group, the first messaging application being
configured to output a notification message indicating
that the group announcement is modified after receiv-
ing the converted group announcement message.

16. The information processing apparatus according to
claim 14, wherein the processing circuitry is configured to:
transmit, based on the first user not being authorized to
modify the group announcement, a notification mes-
sage indicating modification failure to the first messaging application, the notification message indicating that modification of the group announcement is not permitted.

17. A non-transitory computer-readable storage medium storing instructions which when executed by a processor cause the processor to perform:

receiving a message from a first messaging application of a first user in a first messaging group, the first messaging application being associated with a first messaging service;

determining, when the message is to be announced to all group members of the first messaging group, whether the first user is authorized to send the message based on identity information of the first user;

performing, based on the first user being authorized to send the message to be announced to all group members, protocol conversion on the message based on a second messaging protocol of a second messaging service to output the message in a first preset announcement style for messages announced to all group members, the second messaging protocol of the second messaging service being different from a first messaging protocol of the first messaging service, the protocol conversion being configured to add a first preset string to the message, the first preset string being configured to cause the message to be announced to all the group members in the first preset announcement style according to the second messaging protocol, wherein a display style of the message in the first preset announcement style is different from a display style of the message when the first preset string is not included in the message; and transmitting, via a second messaging server, the converted message to a second messaging application corresponding to one of the group members in the first messaging group.

18. The non-transitory computer-readable storage medium according to claim 17, wherein the determining whether the first user is authorized comprises:

acquiring the identity information of the first user in the first messaging service;

determining, in response to the identity information indicating that the first user is a group owner or an administrator of the first messaging group, that the first user is authorized to send the message to be announced to all group members of the first messaging group; and determining, in response to the identity information indicating that the first messaging application is not the group owner or the administrator of the first messaging group, that the first user is not authorized to send the message to be announced to all group members of the first messaging group.

19. The non-transitory computer-readable storage medium according to claim 17, wherein the performing the protocol conversion comprises:

generating the converted message by adding the first preset string to the message.

20. The non-transitory computer-readable storage medium according to claim 19, further comprising:

acquiring, based on the first user being authorized to send the message to be announced to all group members, corresponding first preset identification information that indicates the message is to be announced to all group members in the first messaging protocol and output in a second preset style for messages announced to all group members;

generating a target message by adding the first preset identification information to the message; and transmitting the target message to the first messaging application of one of the group members in the first messaging group.

* * * * *